Feb. 13, 1940. E. D. CRAMMOND 2,190,108
GUIDE SUPPORT AND FLEXIBLE CONDUCTOR
Original Filed Oct. 26, 1935 2 Sheets-Sheet 1
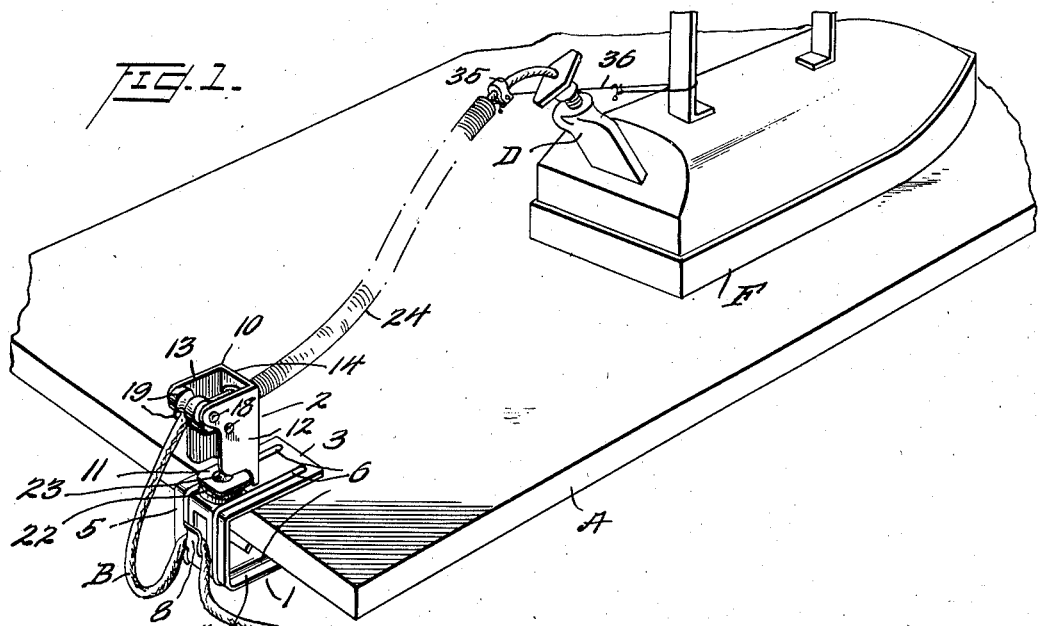
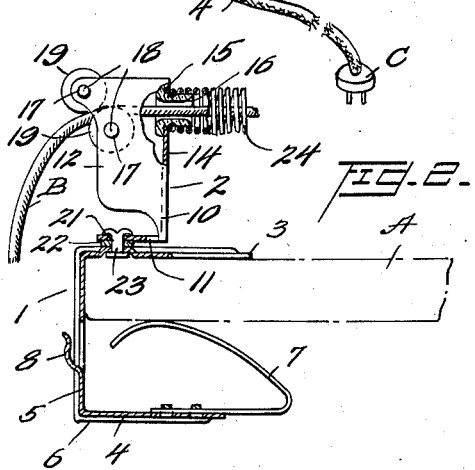
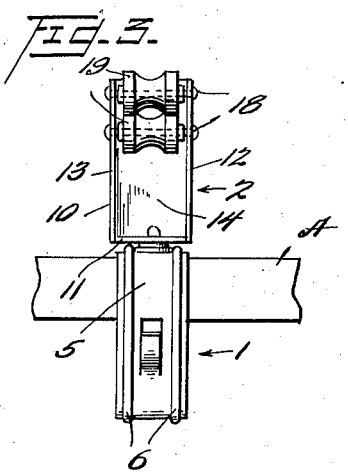
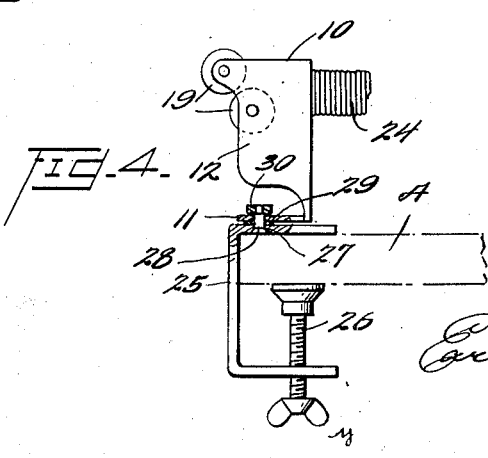
Inventor
Earle D. Crammond.
Attorney Feb. 13, 1940.  E. D. CRAMMOND  2,190,108
GUIDE SUPPORT AND FLEXIBLE CONDUCTOR
Original Filed Oct. 26, 1935  2 Sheets—Sheet 2
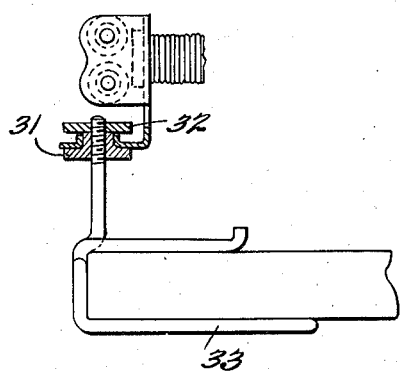
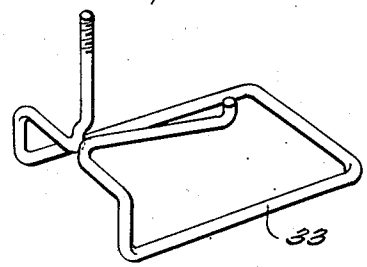
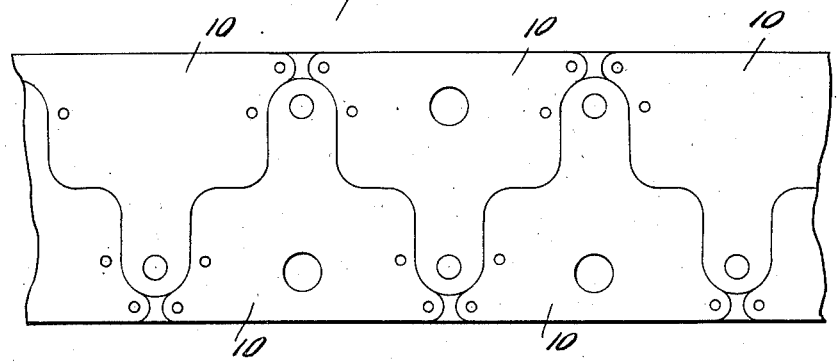
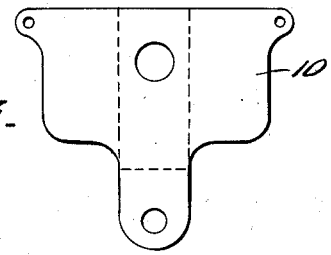
Inventor
Earle D. Crammond
By
Attorney

Patented Feb. 13, 1940

2,190,108

UNITED STATES PATENT OFFICE 2,190,108

GUIDE SUPPORT AND FLEXIBLE CONDUCTOR

Earle D. Crammond, Washington, D. C.

Application October 26, 1935, Serial No. 46,946
Renewed July 7, 1939

2 Claims. (Cl. 248—51)

This invention relates to conductor cord take-up devices especially adapted for use in connection with portable electric translating devices which, when in use, are caused to be moved to various positions in contacting articles of work on a work supporting table.

Electrical translating devices such as flat irons are usually connected with an outlet or fixed current tap by a detachable flexible conductor cord to permit movement of the device with respect to a work table. In using such devices as an electric iron on an ironing table, the slack in the conductor cord, if not supported and maintained out of contact with the articles worked on, hinders an operator and is liable to soil the articles. A conductor cord, because of its metallic conductors, is relatively heavy and such a cord, if allowed to drag over fixed and uninsulated surfaces, soon becomes badly damaged and useless. It is one of the objects of the invention to provide a conductor guide and support which will adequately guide and support the conductor cord out of contact with articles worked on, without kinking and free from damaging frictional contact with the support and guide structure.

Further objects of the invention include the provision of a conductor guide and support including an insulating antifriction guide bearing; the provision of a structure adapted for interchangeable use with a plurality of base supports; and the provision of a structure which is simple, efficient and inexpensive to manufacture and which may be quickly mounted on or detached from a work table.

Specific details of structure and further objects of the invention will be apparent from the following detailed description of the specification and by reference to the drawings forming a part thereof, wherein—

Fig. 1 is a perspective view showing an embodiment of the invention applied to an electric iron.

Fig. 2 is a view in elevation of the device of Fig. 1, showing some parts in section.

Fig. 3 is a rear view in elevation of the device of Fig. 2.

Fig. 4 is a view in elevation of the cord guide and support and a modified form of clamp base support with the connection between the parts shown in section.

Fig. 5 shows a modified form of base support and a modified form of mounting for the cord guide and support.

Fig. 6 is a perspective view of the clamp of Fig. 5.

Fig. 7 is a plan view of sheet metal stock with the manner of cutting out therefrom the guide and support stampings.

Fig. 8 is a view of a single stamping before forming with points of bending indicated by dotted lines.

Referring to Fig. 1 of the drawings, A represents a work support in the form of an ironing table. I indicates a spring table clamp forming a base support for a cord guide and support 2 pivotally mounted on the support. This cord guide and support generally stated comprises an apertured sheet metal stamping forming a main frame support carrying an insulating anti-frictional guide bearing and a coiled spring elastic tube. The elastic tube is attached at one end to the main frame support and at the other end to a clamp engaging at a predetermined point a conductor cord B which extends through the elastic tube, apertured frame and insulating anti-friction guide bearing. The cord is equipped with connectors C and D at its ends for cooperating with a fixed outlet E and the electrical translating device F.

Referring to the drawings, and in particular to the form of the invention illustrated in Fig. 1, the numeral I indicates a spring clamp for engaging over the edge of a work table such as an ironing board or the like. This clamp forms a base support for a conductor guide and support structure 2 pivotally mounted on the body of the clamp. The clamp comprises a main body portion having spaced parallel horizontal arms 3 and 4 and an integral connecting web portion 5. The entire body of the clamp is preferably formed from an integral sheet metal stamping of relatively thin stock which may be reinforced and stiffened by a plurality of stiffening ribs 6 extending longitudinally of the blank. A leaf spring 7 is suitably anchored in the lower arm of the clamp and traverses the space between the two horizontal arms so as to resiliently engage the under surface of a work support when the clamp is positioned over the edge of the support. The connecting web portion of the clamp has struck therefrom an integral tongue 8 which is pressed outwardly of the main clamp metal and formed to provide an anchoring hook for a portion of a conductor cord. The lower end of the spring 7 is arranged under metal straps struck up from the metal of the lower arm, as illustrated, or may be fastened in any well known manner to provide a secure anchorage for the spring.

The conductor guide and support 2 comprises a main body or bracket portion which may be made of reinforced molded composition but preferably is formed from an integral sheet metal stamping 10 having an apertured lower supporting arm 11 and an upper frame portion including two side wings 12 and 13 and a connecting upright end wall structure 14. The upright end wall structure is apertured centrally adjacent its upper edge, at 15, to form a passage for a conductor cord. A flanged insulating or metal bushing 16 may be positioned in the aperture to be held therein by a coil spring elastic tube 24, or the coil spring may be directly attached to the bracket. The side walls are each apertured, at 17, to receive horizontal pintles 18 supporting thereon grooved insulated rollers 19 of an anti-friction roller guide bearing support for conductor cord B passing between the rollers and through the bushing. The rollers forming the roller bearing support may be of wood or molded insulating composition and the mounting in the side arms is so located that the peripheries of the rollers at their largest diameter do not contact each other but are arranged sufficiently close to each other to define with their central grooved portions a guiding aperture which is substantially circular. The anti-friction bearing and the aperture defined by the grooved rollers is so located and proportioned with respect to the aperture in the upright end wall structure as to guide and support a conductor cord moving through the rollers and the apertured bracket out of frictional contact with the edge of the bushing or the end wall structure, as the case may be.

The elastic tube 24 has one end attached to the insulating bushing extending through the bracket in a manner well known in the art. This end of the tube may also be directly attached to the metal of the stamping, if desired, thus omitting the insulating bushing. The outer or free end of the elastic tube is provided with a small insulating clamp 35 which is arranged for attachment to the conductor cord B at a predetermined point of adjustment. A strain reliever 36 may extend from the clamp for detachable engagement with a portion of the electrical translating device to relieve the strain on the conductor cord B at the point of connection with the attachment plug. This strain reliever will also transmit the direct pull of the translating device when in use to the end of the elastic tube. The conductor cord B extends through the elastic tube which serves as a conduit therefor and through the apertured guide support stamping and between the grooved insulating rollers. When the translating device is moved away from the guide support over the surface of a work table, the spring will be extended, and when the device is returned toward the cord guide and support, the spring will contract under its own tension. In reciprocatory movement of the electrical device, it will be seen that the conductor cord will be automatically fed back and forth through the insulating guide bearing and the elastic tube and the position of the guide and support being adjacent the edge of the work support will cause the cord to be deposited in a loop hanging free of the edge of the table. A portion of the cord between the loop therein and the end connection with an electrical outlet may be clamped in the spring clip 8 to avoid disconnecting the cord from the outlet in normal operation of the electrical translating device.

Conductor cords embodying metallic conductors being relatively heavy have a tendency to fall abruptly over the edge of any support. In the structure just described, the insulating roller bearing guides a conductor cord positioned between the rollers directly into and out of the center of the insulating bushing and the elastic tube so as to preclude a substantial frictional engagement with edges of the structure. This avoids friction on the conductor cord covering and lessens the force required to move the conductor lengthwise through the cord guide and support.

The lower supporting arms of the cord guide and support is apertured, at 21, and is riveted for rotatable mounting on the clamp base support 1. This rotatable mounting, as illustrated, involves a washer 22 interposed between the supporting arm and the upper surface of the clamp and a rivet 23 passing through the clamp washer and supporting arm of the guide and support. Any well known mounting means may be employed to effect the swivel joint between the clamp and the cord support, modifications thereof being shown in the structures of Figs. 4 and 5. The main body of the guide structure may be interchangeably mounted on supporting bases and clamps differing in structure from that illustrated in Fig. 2. Examples of modified supporting bases and clamp supports are illustrated in Figs. 4 and 5 of the drawings. In Fig. 4, the clamp 25 comprises an ordinary U-shaped clamping bracket having a threaded fastening screw 26 passing through the lower arm of the clamp for attaching the clamp to a table or work support. The upper arm of this clamp is apertured at 27 to receive a headed stud 28 reduced and screw threaded at its outer end. The reduced portion of the stud defines a shoulder and body portion which is slightly higher than the combined thickness of a washer 29 and the lower support arm 11 of the cord guide structure. A nut 30 screw threaded on the reduced portion of the stud serves to hold the elements in position on the clamp and allows rotation of the cord guide in its supported position.

In Fig. 5, the table clamp consists of a bent wire member having a vertical extension screw threaded at its upper end. A nut 31 is screw threaded on the upright member and has a reduced portion defining a horizontal flange. The lower supporting arm of the guide structure surrounds the reduced portion of this nut and is here shown with a portion of the metal struck upwardly to form a vertical bearing surface cooperating with the nut shank. A lock nut 32 is threaded on the upper end of the upright member into engagement with the reduced extension of the lower nut. The space between the horizontal flange of the lower nut and the bottom of the lock nut is slightly larger than the thickness of the guide support arm and allows the guide support to rotate with the nut assembly forming a bearing therefor.

The stamping 10 shown in Fig. 7, is struck from sheet metal stock with a minimum waste of metal, as shown by the stamping plan detail illustrated by Fig. 6. It will be noted that the manner of cutting the stampings from metal stock practically eliminates waste of material and the result as embodied in the finished stamping is a simple structure which can be manufactured with a minimum of cost.

In operation of the structure which has been described, it will be noted that the weight of the cord forming the depending loop below the upper surface of the work support will be taken chiefly by the insulating anti-friction bearing comprising the grooved rollers and passage of the cord back and forth through this roller bearing is confined to the central portion of the cord bearing support. The rollers of the guide bearing rotating during reciprocation of the cord afford little or no response and serve to direct the cord centrally through the apertured frame support and the elastic tube, thus unnecessary fraying caused by wear on the cord is avoided and the normal life of the connection is materially lengthened. The weight of the cord loop hanging from the roller bearing tends to maintain the cord centrally of the coil spring elastic tube minimizing friction within the tube.

In the preferred embodiment of the invention selected for illustration, the anti-friction insulating guide bearing comprises grooved insulating rollers although operative structures are obtainable with the use of ball bearings and four ordinary rollers mounted in cooperating opposed pairs. Such modifications are contemplated under the generic expression anti-friction guide bearing embodied in the foregoing description of the invention. While the invention is described in connection with the preferred embodiment, it is to be understood that the words which have been used are words of description rather than of limitation and that changes within the purview of the appended claims may be made without departing from the true scope and spirit of the invention in all its aspects.

I claim:

1. In a device of the character described comprising a conductor cord, a tubular elastic conduit for the cord, means for securing one end of said conduit in fixed relationship with a portion of said cord, and a bracket fixed to the other end of said conduit; means to minimize wear of said cord comprising a plurality of rotatable anti-friction elements supported on said bracket closely adjacent the other end of said conduit, said elements cooperating to form a passageway for said cord, said passageway being in alignment with the end of the conduit to guide said cord centrally into and from the conduit free from contact with the bracket and conduit end.

2. In a device of the character described comprising a conductor cord, a tubular elastic conduit for the cord, means for securing one end of said conduit in fixed relationship to said cord, and a bracket fixed to the other end of said conduit; means to minimize wear of said cord comprising a plurality of vertically spaced peripherally grooved anti-friction rollers supported on said bracket closely adjacent the other end of said conduit, said rollers cooperating to form a passageway for said cord, said passageway being in alignment with the end of the conduit to guide said cord centrally into and from the conduit free from contact with the bracket and conduit end.

EARLE D. CRAMMOND.